US010560445B2

(12) United States Patent
Mathaiyan et al.

(10) Patent No.: US 10,560,445 B2
(45) Date of Patent: *Feb. 11, 2020

(54) SECURE ACCESS TO VIRTUAL MACHINES IN HETEROGENEOUS CLOUD ENVIRONMENTS

(71) Applicant: Cisco Technology, Inc., San Jose, CA (US)

(72) Inventors: Jaiganesh Mathaiyan, Austin, TX (US); Subramanian Chandrasekaran, San Jose, CA (US); Madhav Madhavshree, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,572

(22) Filed: Jul. 11, 2018

(65) Prior Publication Data

US 2018/0324167 A1 Nov. 8, 2018

Related U.S. Application Data

(62) Division of application No. 14/804,248, filed on Jul. 20, 2015, now Pat. No. 10,050,951.

(51) Int. Cl.
*H04L 9/32* (2006.01)
*H04L 29/06* (2006.01)
(Continued)

(52) U.S. Cl.
CPC ............ *H04L 63/08* (2013.01); *G06F 9/4856* (2013.01); *G06F 21/44* (2013.01); *H04L 9/0891* (2013.01);
(Continued)

(58) Field of Classification Search
CPC . H04L 63/08; H04L 63/0428; H04L 63/0815; H04L 9/0891; H04L 9/3271; G06F 9/4856; G06F 21/44
(Continued)

(56) References Cited

U.S. PATENT DOCUMENTS 8,799,997 B2 * 8/2014 Spiers ................. H04L 63/0218
726/3
9,560,036 B2 * 1/2017 Hinton .................. H04L 9/3228
(Continued)

OTHER PUBLICATIONS

Cisco Technology, Inc., "Cisco Intercloud Fabric Security Features: Technical Overview," White Paper, May 2015.
(Continued)

*Primary Examiner* — Samson B Lemma
(74) *Attorney, Agent, or Firm* — Polsinelli PC

(57) ABSTRACT

Systems, methods, and computer-readable media provide for secure access to virtual machines in heterogeneous cloud environments. In an example embodiment, client credentials, such as a public key of a public-private key pair, are provided to a virtual machine in a first cloud, such as a private cloud. The virtual machine can be migrated from the first cloud to a second cloud, such as one of a plurality of heterogeneous public clouds. The virtual machine in the second cloud can be accessed from the first cloud via Secure Shell (SSH) authentication using the client credentials. The client credentials can be updated, and the updated client credentials can be used for subsequent SSH access to the virtual machine in the second cloud.

17 Claims, 7 Drawing Sheets

(51) Int. Cl.
*G06F 9/48* (2006.01)
*H04L 9/08* (2006.01)
*G06F 21/44* (2013.01)

(52) U.S. Cl.
CPC ........ *H04L 9/3271* (2013.01); *H04L 63/0428* (2013.01); *H04L 63/0815* (2013.01)

(58) Field of Classification Search
USPC .......................................................... 713/168
See application file for complete search history.

(56) References Cited

U.S. PATENT DOCUMENTS

| | | | |
|---|---|---|---|
| 9,678,803 B2* | 6/2017 | Suit | H04L 41/0853 |
| 2012/0096134 A1* | 4/2012 | Suit | G06F 9/5072 |
| | | | 709/221 |
| 2012/0265976 A1* | 10/2012 | Spiers | H04L 63/0218 |
| | | | 713/2 |
| 2013/0268757 A1* | 10/2013 | Kulkarni | G06F 21/33 |
| | | | 713/168 |
| 2015/0235308 A1* | 8/2015 | Mick | H04L 43/0817 |
| | | | 705/26.3 |
| 2016/0062786 A1* | 3/2016 | Meng | G06F 9/45558 |
| | | | 718/1 |

OTHER PUBLICATIONS

Cisco Technology, Inc., "Cisco Hybrid Cloud Solution: Deploy an E-Business Application with Cisco Intercloud Fabric for Business," White Paper, 2015.

* cited by examiner

SECURE ACCESS TO VIRTUAL MACHINES IN HETEROGENEOUS CLOUD ENVIRONMENTS

CROSS-REFERENCE TO RELATED APPLICATIONS

This application is a divisional of U.S. application Ser. No. 14/804,248, filed on Jul. 20, 2015, entitled "Secure Access To Virtual Machines In Heterogenous Cloud Environments," which is expressly incorporated herein by reference in its entirety.

TECHNICAL FIELD

The present technology relates in general to the field of computer networks, and more specifically to providing secure access to virtual machines in heterogeneous cloud environment.

BACKGROUND

Industry trends indicate a growing movement among enterprises and other entities to hybrid cloud designs. These enterprises and other entities are choosing such designs to acquire additional on-demand computing, storage, and network resources, thereby eliminating the need to build for peak capacity within their own data centers. Public clouds do not have the same initial capital investments that may be necessary to build out a company's own private data center. In addition, a public cloud can better absorb a company's need for elasticity by providing almost unlimited pay-as-you-grow expansion. Although hybrid cloud models are conceptually and financially very attractive, customers are often reluctant to place their applications in the public cloud, away from their own premises. When an organization deploys an application or part of an application in the public cloud, it wants to be sure that the transition from the private data center to a hybrid model is not only operationally feasible, but also that the company retains data access and control in the new architecture.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
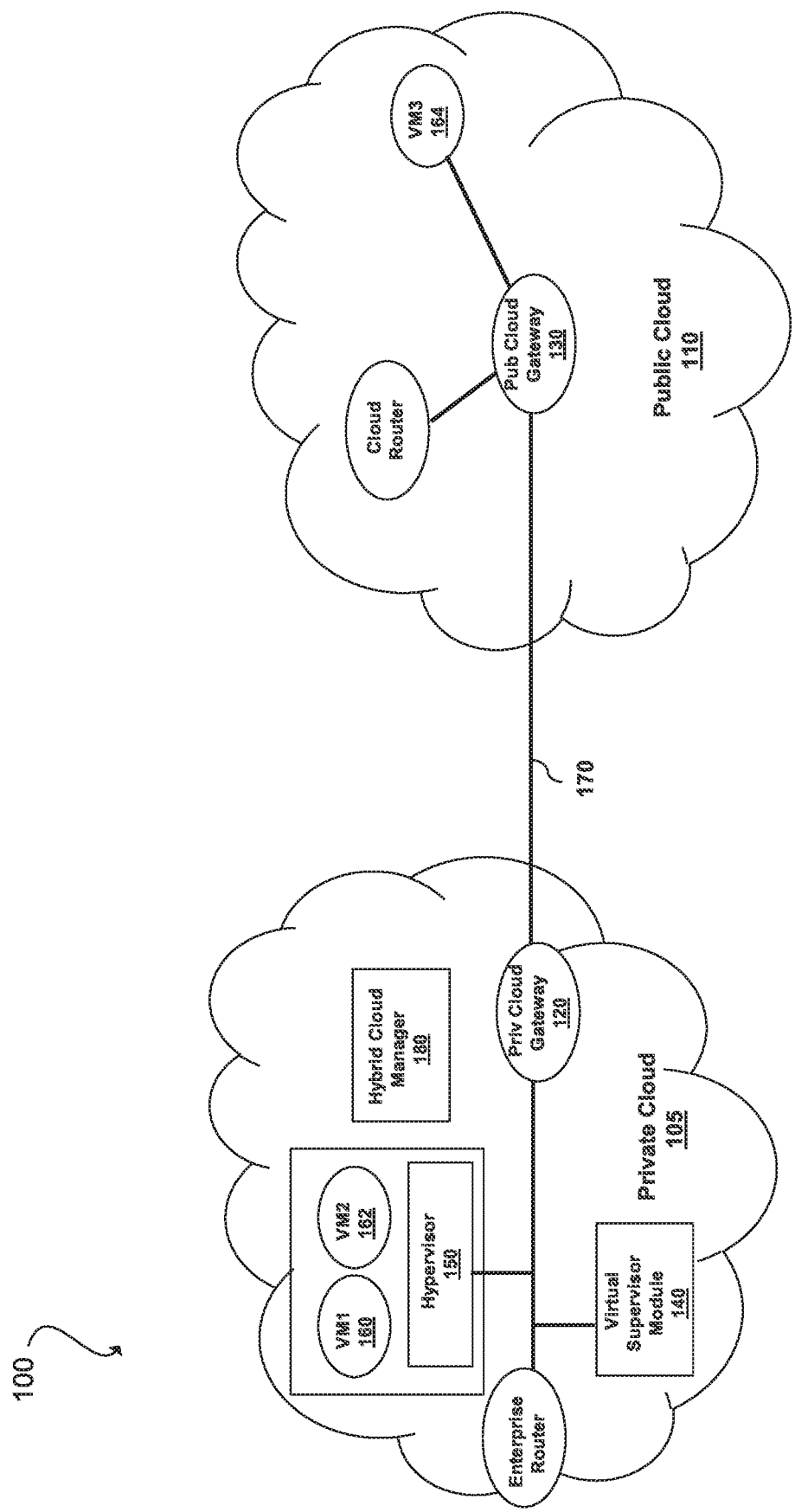
FIG. 1 illustrates an example hybrid cloud environment that can be implemented in an example embodiment.

The detailed description set forth below is intended as a description of various configurations of example embodiments and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Secure access from a first cloud environment, such as a private cloud, to virtual machines in heterogeneous cloud environments, such as a plurality of public clouds, can be provided via Secure Shell (SSH). In an example embodiment, client credentials, such as a public key of a public-private key pair, are generated and inserted into a virtual machine in the first cloud environment. The virtual machine can be migrated from the first cloud network to a second cloud network. The virtual machine in the second cloud network can then be accessed from the first cloud network via SSH authentication using the client credentials. The client credentials can be updated (or rekeyed), and the updated client credentials can be used for later access to the virtual machine in the second cloud via SSH.

In some example embodiments, the virtual machine in the second cloud can be authenticated utilizing its host key. For example, the host key, such as a public-private key pair, can be generated and inserted into the virtual machine prior to migrating the virtual machine from the first cloud to the second cloud. Upon an initial attempt to login to the virtual machine in the second cloud via SSH, the identity of the virtual machine can be verified based at least in part on the host key or data relating to the host key, such as a public key of the host key or a fingerprint of the public key. After the virtual machine has been authenticated, such as by matching the public key or the fingerprint to an entry associated with the virtual machine in a database of known hosts, the host key can be rekeyed and the database can be updated with the new host key or the data relating to the host key.

DETAILED DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Overlay networks can also include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Cloud computing can also be provided in a network to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and networking, among others. For instance, resources may include service devices (firewalls, deep packet inspectors, traffic monitors, load balancers, etc.), compute/processing devices (servers, CPUs, GPUs, random access memory, caches, etc.), and storage devices (e.g., network attached storages, storage area network devices, hard disk drives, solid-state devices, etc.), among others. In addition, such resources may be used to support virtual networks, virtual machines, databases, applications ("apps"), etc.

Cloud computing resources may include a "private cloud," a "public cloud," and/or a "hybrid cloud." A "private cloud" is a cloud infrastructure operated by an enterprise for use by the enterprise, while a "public cloud" is a cloud infrastructure that provides services and resources over a network for public use. A "hybrid cloud" is a cloud infrastructure composed of two or more clouds that inter-operate or federate through technology. A hybrid cloud can be thought of as an interaction between private and public clouds where a private cloud joins a public cloud and utilizes public cloud resources in a secure and scalable manner. Cloud computing resources can also be provisioned via virtual networks in an overlay network, such as a VXLAN.

Enterprises are increasingly implementing heterogeneous virtualization environments, and are thus potentially required to provide support for multiple types of hardware architectures, hypervisors, host and guest operating systems, and other virtualization infrastructure components, as well as seamless integration with multiple cloud providers. Utilizing multiple cloud providers, however, may increase complexity for matters such as compliance, control, and security. Incompatibility issues caused by heterogeneous virtualization environments can also have a negative impact on achieving universal access to public cloud providers. In addition, security concerns can prevent adoption or limit usage of hybrid cloud solutions. Those concerns can include unsecured connections and limited workload protection.

Figure 2:
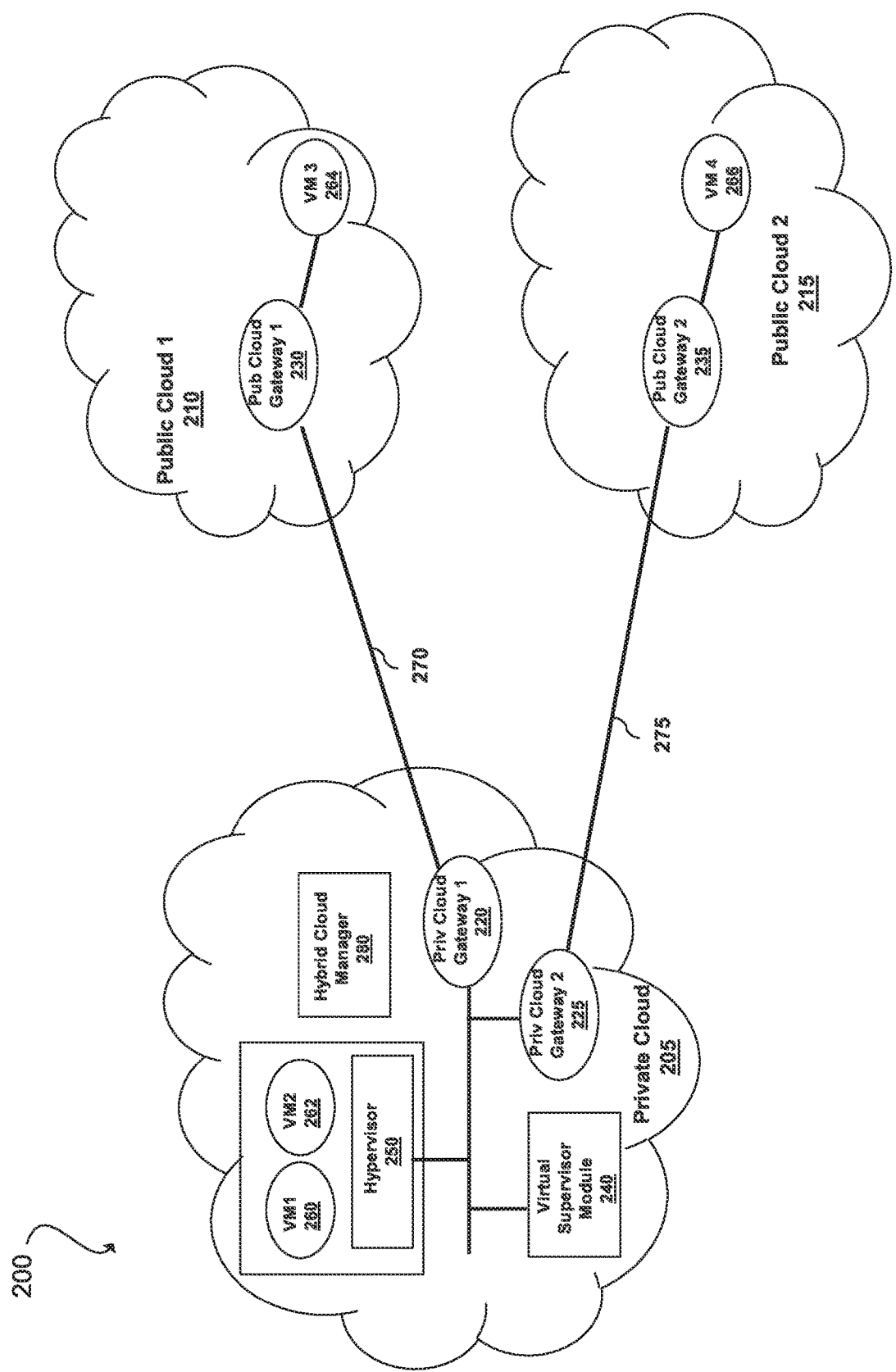
FIG. 2 illustrates an example hybrid cloud environment that can be implemented in an example embodiment.
Figure 3:
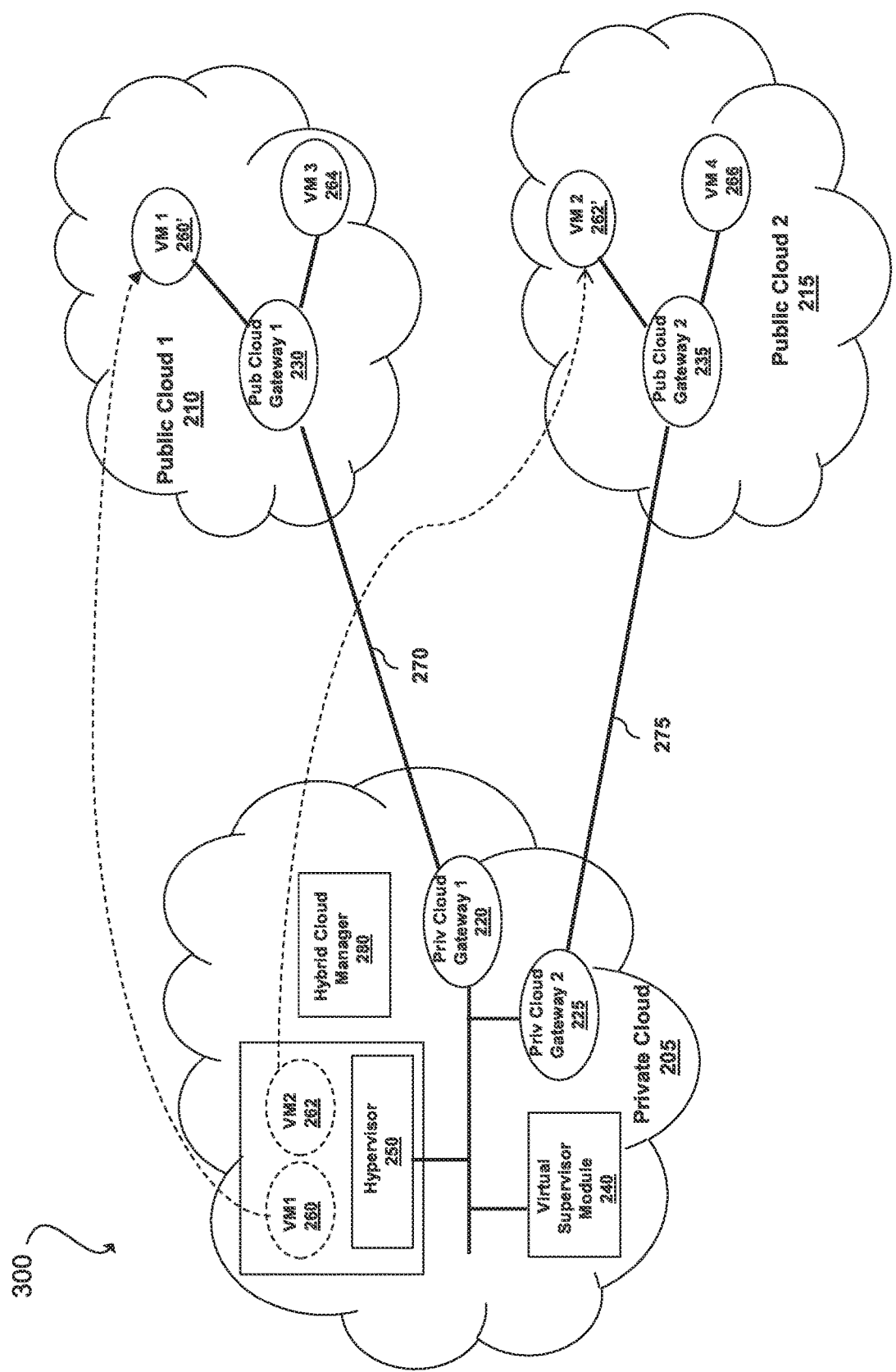
FIG. 3 illustrates an example approach for migrating virtual machines from a first cloud environment to heterogeneous cloud environments according to an example embodiment.

The disclosed technology addresses the need in the art to support heterogeneous virtualization infrastructures, ensure end-to-end security, and provide unified workload management and mobility across clouds. Disclosed are systems and methods for providing a secure mechanism to access virtual machines in a public cloud that is independent of the public cloud provider. A brief introductory description of example environments, as illustrated in FIGS. 1-3, is disclosed herein. A detailed description of enabling SSH access to virtual machines that are migrated from a first cloud to a second cloud, and example variations, will then follow. These variations shall be described as the various example embodiments are set forth. The disclosure now turns to FIG. 1.

FIG. 1 illustrates an example hybrid cloud network 100 comprising a plurality of networks or clouds, including a private cloud 105 (e.g., an enterprise datacenter) and a public cloud 110 separated by a public network, such as the Internet (not shown). Although a hybrid cloud is sometimes defined as consisting of a private cloud and a public cloud, it should be understood that many aspects of this disclosure can be practiced in various configurations (e.g., two or more clouds hosted by third party providers and/or two or more enterprise clouds located in different locations). The private cloud 105 and public cloud 110 can be connected via a communication link 170 between private cloud gateway 120 (e.g., an Intercloud Fabric™ Extender (ICX) from Cisco®, Systems, Inc. (Cisco) of San Jose, Calif.) and a public cloud gateway 130 (e.g., an Intercloud Fabric Switch (ICS) from Cisco) (the ICX/ICS pair forming an Intercloud Fabric Cloud (ICFCloud)). Data packets and traffic can be exchanged among the devices of the hybrid cloud network using predefined network communication protocols as will be understood by those skilled in the art.

As depicted in FIG. 1, each cloud can have a cloud gateway, such as private cloud gateway 120 (e.g., ICX) in the private cloud 105, and public cloud gateway 130 (e.g., ICS) in the public cloud 110. The private cloud gateway 120 can be configured as a VM for establishing the communication link 170, which can be used to connect the components in the public cloud 110 with the private cloud 105. Likewise, the public cloud gateway 130 can be configured as a VM running in the public cloud 110 to connect to the communication channel 170 for enabling the public cloud gateway 130 to communicate with cloud resources.

In some example embodiments, the private cloud gateway 120 (e.g., ICX) can establish a secure site-to-site tunnel to interconnect with the public cloud gateway 130 (e.g., ICS), and interact with the virtual supervisor module (VSM) 140 (e.g., a Cisco Nexus® 1000V switch). The VSM 140 can serve as a management interface for this secure cloud extension between the private cloud 105 and the public cloud 110. In some example embodiments, the public cloud gateway 130 can establish a secure site-to-site tunnel to interconnect with the private cloud gateway 120 and secure access tunnels to connect the public cloud VMs, and monitor and report statistics for the public cloud VMs and any component failures in the public cloud 110. In some example embodiments, the private cloud gateway 120 and the public cloud gateway 130 can be deployed as a high-availability pair to provide redundancy. In some example embodiments, the public gateway 130 can include a virtual Ethernet module (VEM) (not shown) that communicates with the VSM to retrieve VM-specific network policies (e.g., port profiles), switches network traffic between public cloud VMs, switches network traffic between public cloud VMs and the private cloud, applies network policies, and monitors and reports VEM-related statistics.

FIG. 1 also illustrates a hybrid cloud manager 180 within the private cloud 105, which can be a management plane VM for auto-provisioning resources within the hybrid cloud network. The hybrid cloud manager 180, in this example, is a management platform running in the private network 105, and can be generally responsible for providing the hybrid cloud operations, translating between private cloud and public cloud interfaces, managing cloud resources, instantiating cloud gateways and cloud VMs though the private virtualization platform and public cloud provider application programming interfaces (APIs). The hybrid cloud manager 180 may also monitor the health of all of the components of the network (e.g., the cloud gateways, the one or more private application VMs, and the communication link 170), and ensure high availability of those components.

In some example embodiments, the hybrid cloud manager 180 is a VM that includes virtual appliances Intercloud Fabric™ Director (ICFD) and Cisco Prime™ Network Services Controller (PNSC) from Cisco. The ICFD is a single point of management and consumption for hybrid cloud solutions for end users as well as IT administrators. The ICFD offers a single console so that end users and IT administrators can provision workloads and associated policies. The ICFD also exposes northbound APIs, which allows customers to programmatically manage their workloads in the hybrid cloud environment or integrate with other cloud management platforms. The PNSC, through a single pane, can automate virtual network management to make configuration changes quickly and consistently. The PNSC supports greater scalability along with standardization and adherence to policies in complex environments. In some example embodiments, the ICFD communicates with the PNSC using the PNSC's northbound APIs, and customers and IT staff do not need to access the PNSC directly for workload creation or deployment.

FIG. 1 also illustrates a hypervisor 150 (also sometimes referred to as a virtual machine manager or a virtual machine monitor (VMM)) and VMs 160, 162 in the private cloud 105. The hypervisor may be computer software, firmware, or hardware that creates and runs one or more VMs, such as VM1 160 and VM2 162. Although VM3 164 is not shown to be encapsulated by a hypervisor in this example, it will be appreciated that VMs may or may not be managed by a hypervisor. Each VM can host a private application, including VM3 164 in the public cloud. The hypervisor 150 can be controlled by the hybrid cloud manager 180, and can provide a respective operating system to one or more VMs. In some example embodiments, a public cloud VM can include an agent (e.g., Intercloud Fabric Agent (ICA) from Cisco) (not shown) that provides the network overlay for VMs in the public cloud. The agent can be deployed in the public cloud VM as a secure tunnel driver. The agent can establish a secure tunnel to connect the public cloud VM to a public cloud gateway (e.g., ICS), and monitor and report secure overlay-related statistics.

As discussed above, FIG. 1 also illustrates communication link 170. Communication link 170 can take several forms, such as various types of virtual private networks (VPNs) or Layer 2 (or "L2" of the illustrative and well-known Open Systems Interconnection model (OSI model)) tunneling protocols. For example, some example embodiments utilize an open VPN (e.g., OpenVPN) overlay or an IP security (IPSec) VPN based L3 network extension to provide communication link 170. Some example embodiments utilize a secure transport layer (i.e., Layer 4 or "L4" of the OSI model) tunnel as the communication link 170 between a first cloud gateway in a private cloud and a second cloud gateway in a public cloud, where the secure transport layer tunnel is configured to provide a link layer (i.e., Layer 2 or "L2") network extension between the private cloud and the public cloud. By establishing a secure transport layer (i.e., L4) tunnel 170 (e.g., transport layer security (TLS), datagram TLS (DTLS), secure socket layer (SSL), etc.) over the public network, the techniques herein build a secure L2 switch overlay that interconnects public cloud resources with private clouds (e.g., enterprise network backbones). In other words, the secure transport layer tunnel 170 provides a link layer network extension between the private cloud and the public cloud.

As noted, the cloud gateway 120 deployed in the private cloud 105 can use an L4 Secure Tunnel to connect to the cloud resources allocated in the public cloud 110. The L4 secure tunnel may be well-suited for use with corporate firewalls and Network Address Translation (NAT) devices due to the nature of the transport level protocols (e.g., UDP/TCP) and the transport layer ports opened for HTTP/HTTPS in the firewall. The L2 network can thus be further extended and connected to each of the cloud VMs (e.g., VM1 160, VM2 162, VM3 164) through the cloud gateway 130 deployed in the public cloud 110. With an L2 network overlay, instances of a particular private application VM (e.g, VM3 164) can be seamlessly migrated to the overlay network dynamically created in the public cloud 110, without any impact to existing corporate infrastructure. In some example embodiments, virtual services can be deployed to provide firewall and routing support in the public cloud 110.

FIG. 2 illustrates an example hybrid cloud environment 200. Like reference numbers and designations indicate the same or functionally similar elements in FIG. 1. In this configuration, private cloud 205 and public clouds 210 and 215 are separated by a public network, such as the Internet (not shown). The private cloud 205 and the public cloud 210 can be connected via a communication link 270 between private cloud gateway 220 (e.g., ICX) and public cloud gateway 230 (e.g., ICS). Similarly, private cloud 205 and the public cloud 215 may be connected via a communication link 275 between private cloud gateway 225 and public cloud gateway 235.

FIG. 2 also illustrates a hybrid cloud manager 280 (e.g., ICFD and PNSC) within the private cloud 205. As discussed above, the hybrid cloud manager 280 can serve as the end user and IT administrator portal for provisioning and management of the hybrid cloud network 200. The hybrid cloud manager can provide visibility into virtual machines in the private cloud 205 along with complete lifecycle management for virtual machines running in the public clouds 210 and 215. The hybrid cloud manager 280 can also be used for managing cloud network services. The private cloud 205 also includes a VSM 240 (e.g., Cisco Nexus 1000V switch), a hypervisor 250, and one or more VMs 260, 262. As discussed above, the hybrid cloud manager 280 can be used to create VMs in the public or private cloud, such as VM1 260, VM2 262, VM3 264, and VM4 266.

FIG. 3 illustrates an example approach 300 for migrating virtual machines from a private cloud to public clouds in a hybrid cloud network similar to the environment illustrated in FIG. 2. Like reference numbers and designations indicate the same or functionally similar elements in FIGS. 1 and 2. In some example embodiments, VMs in the private cloud 205 may need to be scaled beyond the current resources of the private cloud, 205 or the private cloud 205 may need to be taken off-line for a period of time. In such situations, it can be desirable to migrate the VMs in the private cloud 205 to one or more of the public clouds 210, 215. In particular, FIG. 3 illustrates VM1 260 in the private cloud 205 being migrated to the public cloud 210, where VM1 is illustrated as VM1 260' Similarly, VM2 in the private cloud 205 is migrated to the public cloud 215, where VM2 is illustrated as VM2 262'. Migration can be managed using hybrid cloud manager 280 (e.g., ICFD and PNSC) in communication with other components of the hybrid cloud network.

In an example embodiment, the migration process can include a series of steps. It should be understood that, for any process discussed herein, there can be additional, fewer, or alternative steps performed in similar or alternative orders, or in parallel, within the scope of the various example embodiments unless otherwise stated. Prior to migration, a secure tunnel driver (e.g., ICA) can be installed in the virtual machine to enable secure communication between public cloud VMs 260', 262', 264, and 266 and public cloud gateways 230, 235 (e.g., ICS's). SSH public-private key pairs can also be generated and inserted into the images for the migrating VMs for purposes of user authentication (e.g., SSH public key) and server authentication (e.g., host key or information relating to the host key, such as a fingerprint of a public component of the host key) as discussed elsewhere herein. The migration process may begin by taking VM1 260 and VM2 262 offline or shutting them down in the private cloud. In other example embodiments, migration can occur "live" or substantially live as known to one of ordinary skill in the art.

Once the images for the migrating VMs have been prepared, they may be converted to a respective cloud format corresponding to the public clouds to which the VMs will be transferred. This can involve first "normalizing" or converting the images to raw image format, and then converting the normalized or raw images to the respective cloud format. Thereafter, the converted image for VM1 260 can be uploaded to the public cloud 210, and the converted image for VM2 262 can be uploaded to the public cloud 215. The migration process may conclude by instantiating or powering on the VMs 260', 262' in the public clouds 210, 215, respectively.

As discussed above, enterprises are rapidly adopting cloud computing in order to meet dynamically changing business requirements. These deployments typically include both private and public clouds, resulting in the creation of hybrid clouds that are designed to rapidly scale up and down in response to user demands. Hybrid cloud models can also provide for economies of scale. In order to benefit from this environment, businesses may need to connect with these hybrid clouds more easily from their heterogeneous bases, and balance requirements for compliance and control against the desire to rapidly innovate and the ability to scale on demand. Systems and approaches in accordance with various example embodiments of the subject technology meet these needs. In particular, various example embodiments utilize SSH as a provider-independent, secure access mechanism for managing virtual machines in the public cloud.

SSH is an encryption-based networking protocol capable of initiating on remote computing systems command shell, port forwarding, file transfer, and data tunneling sessions, among other functions. SSH provides for secure network communications that can be less complex and expensive than other techniques, such as hardware-based VPN implementations or approaches based on a certificate authority or certification authority (CA). Further, SSH is available on most operating systems. SSH offers four security measures—user authentication, host authentication, data encryption, and data integrity. User authentication can be utilized for ensuring that access to a system is limited to credentialed users. Credentials can include passwords, private keys generated from public-key cryptography methods (e.g., Rivest-Shamir-Adleman (RSA), Digital Signature Algorithm (DSA), Elliptical Curve Digital Signature Algorithm (ECDSA), Diffie-Helman (DH), Elliptic Curve Diffie-Hellman (ECDH)), secret keys generated from symmetric-key cryptography methods (e.g., International Data Encryption Algorithm (IDEA), Data Encryption Standard (DES), Triple-DES, Advanced Encryption Standard (AES), ARC-FOUR (RC4), Blowfish, Twofish, Carlisle Adams Stafford Tavares (CAST), etc.), among other types of credentials. However, SSH can be adapted to use other authentication methods (e.g., Kerberos, NT LAN Manager (NTLM), and keyboard-interactive, etc.), including new authentication methods as they become available.

Host authentication can be used by a server to establish its identity to a client, and by the client to determine whether the server is a known host. Host authentication may be used to prevent Man-in-the-Middle attacks and other security threats. An example of a Man-in-the-Middle attack involves a first valid user requesting a second valid user for the second user's public key; a malicious user intercepting the public key of the second user; the malicious user sending a forged message to the first user including the malicious user's public key; the first user sending an enciphered message encrypted using the malicious user's public key; and the malicious user intercepting the enciphered message, deciphering the enciphered message using the malicious user's private key, and re-encrypting the message using the second user's public key. Subsequent communications between the first user and the second user can be intercepted and modified by the malicious user.

Data encryption transforms plaintext to unreadable ciphertext using a cipher, and decryption reverts ciphertext to the original plaintext using the same cipher. In SSH, data encryption functions to protect communications between a client and a server during a session from sniffing or eavesdropping attacks. The symmetric-key algorithms discussed above can be utilized for encrypting the session communications.

Data integrity refers to ensuring that data sent from one of the valid SSH participants arrives unaltered to the other valid SSH participant. SSH can implement hash functions for maintaining data integrity (e.g., Cyclic Redundancy Check (32-bit) (CRC-32), Message Authentication Code (MAC), Universal hashing Message Authentication Code (UMAC), Message Digest algorithm number 5 (MD5), Secure Hash Algorithm (SHA-1), Research and Development in Advanced Communications Technologies ((RACE) Integrity Primitives Evaluation (RIPE)) Message Digest (160-bits) (RIPEMD-160), etc.).

Figure 4A:
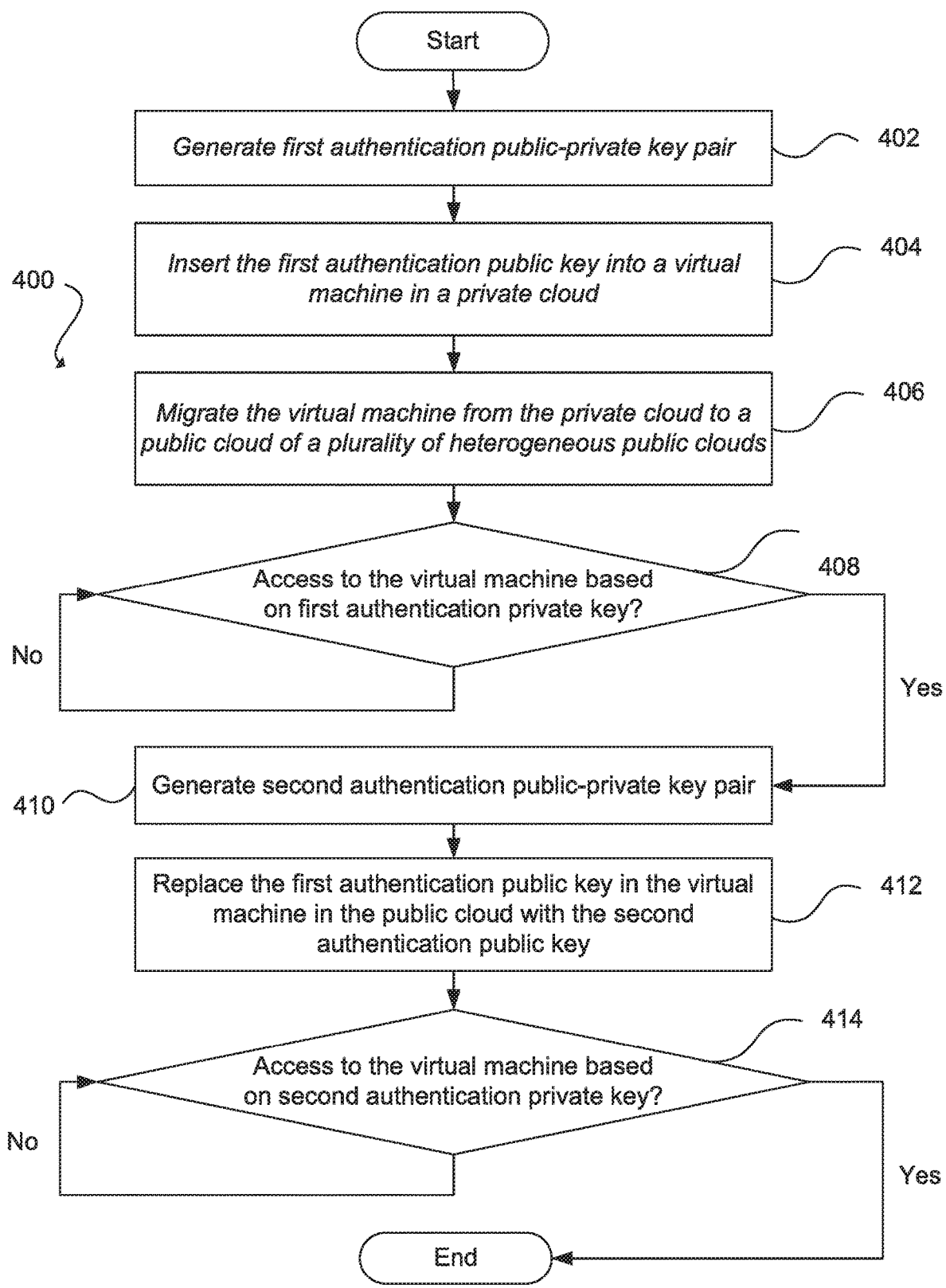
FIGS. 4A and 4B illustrate example processes for providing secure access to a virtual machine in a heterogeneous cloud environment according to an example embodiment.

FIG. 4A illustrates an example process 400 for providing secure access to virtual machines in heterogeneous cloud environments in accordance with an example embodiment. Method 400 begins at step 402 in which a first SSH authentication public-private key pair is generated using a public-key cryptography method (e.g., RSA, DSA, ECDSA, DH, ECDH, etc.). It will be appreciated that other example embodiments can utilize other credentials or other authentication methods (e.g., passwords, secret keys of symmetric-key cryptography algorithms, Kerberos, NTLM, keyboard-interactive, etc.). In this example embodiment, the first authentication public-private key pair is unique to this virtual machine. In other example embodiments, the first authentication public-private key pair can be shared globally with any virtual machine that will be migrated from a private cloud to a public cloud of a hybrid cloud network. After the first authentication public-private key pair is generated, the first authentication public key (or other credential(s)) is inserted into a virtual machine running in the private cloud 404. For example, the first authentication public key can be added to a database or similar object (e.g., list) of authorized keys in the virtual machine. In some example embodiments, a secure tunnel driver (e.g., ICA) can also be installed or otherwise inserted into the virtual machine. The secure tunnel driver enables a secure tunnel to be established to connect the virtual machine to a public cloud gateway (e.g., ICS).

The process 400 can continue with migration of the virtual machine from the private cloud to a public cloud 406, such one of many heterogeneous clouds operated by third party providers. As discussed above, migration can include normalizing or converting an image of the virtual machine to raw image format, converting the normalized or raw image to a cloud format of the public cloud, uploading the converted image to the public cloud, and powering on the virtual machine in the public cloud. In some example embodiments, migrating the virtual machine from the private cloud to the public cloud includes generating a template incorporating the virtual machine, and deploying the virtual machine to the public cloud using the template. A potential problem with this approach, however, is that the authentication public key becomes available to the cloud provider and other third parties. This can be resolved by re-keying the authentication public key as discussed further below.

The virtual machine, now running in the public cloud, can be accessed from the private cloud via SSH 408, such as by a hybrid cloud manager (e.g., ICFD and PNSC) or similar system or user. Attempts to access the virtual machine will require authentication of the hybrid cloud manager. In this example embodiment, the virtual machine can send a challenge to the hybrid cloud manager. The hybrid cloud manager can respond to the challenge by encrypting the challenge or other data using the first authentication private key, and sending the encrypted challenge or other data to the virtual machine. The virtual machine can decrypt the encrypted challenge or other data using the first authentication public key to verify the identity of the hybrid cloud manager. For example, the virtual machine can compare the decrypted challenge or other data to the original challenge or other data. In other example embodiments, other authentication methods can be implemented as discussed elsewhere herein.

Once the hybrid cloud manager has successfully accessed the virtual machine in the public cloud, the hybrid cloud manager's authentication public key can be re-keyed. This can be achieved by generating a second SSH authentication public-private key pair 410, and replacing the first authentication public key in the virtual machine with the second authentication public key 412. The second authentication private key (or other credential(s)) can be saved and retained securely for subsequent access to the virtual machine 414 in a manner similar to step 408. In this example embodiment, the second authentication public-private key pair is also unique to this virtual machine. In other example embodiments, the second public-private key pair can be shared by all of the virtual machines of this specific public cloud (e.g., ICFCloud).

Figure 4B:
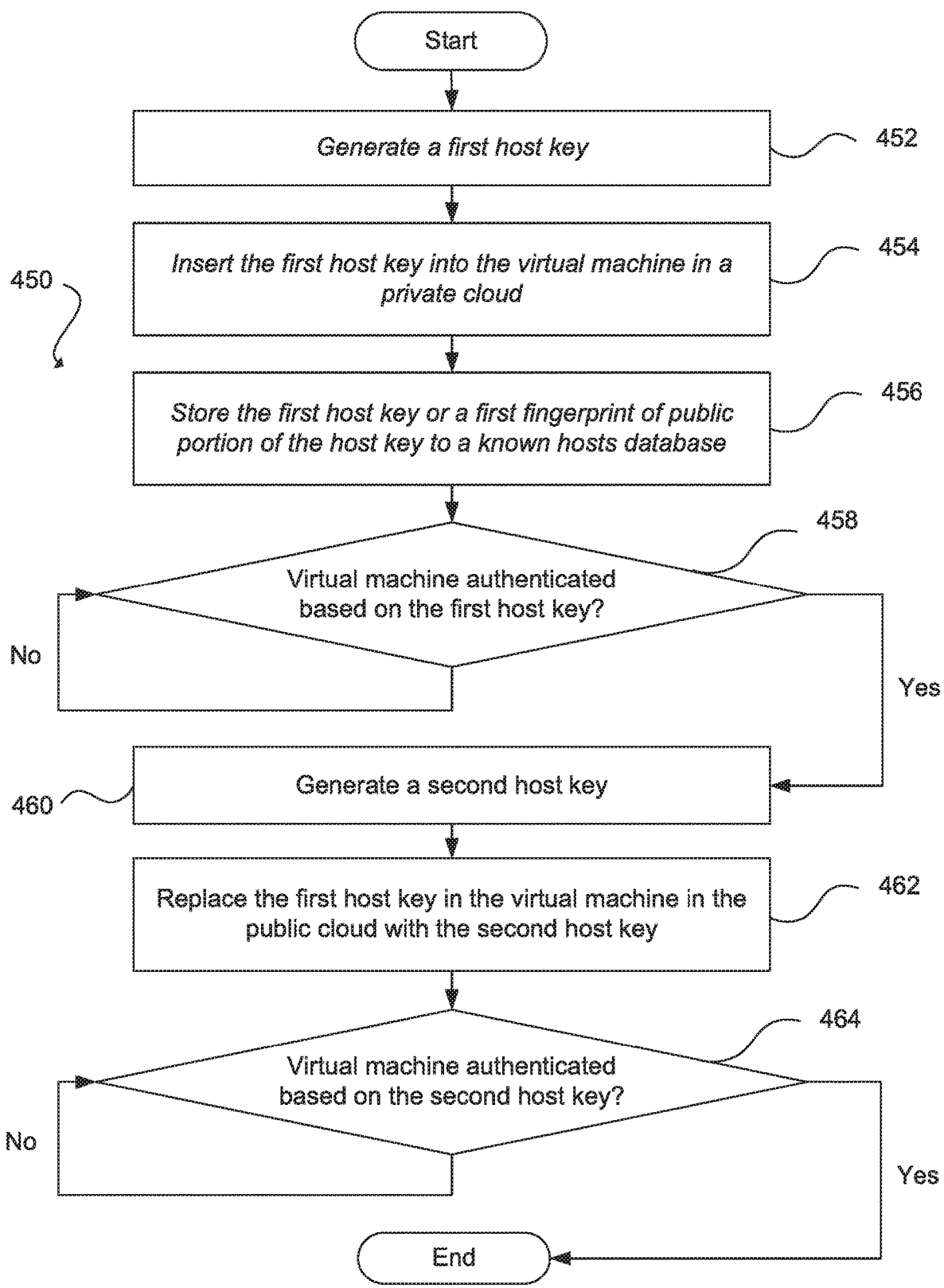

The process 400 can be independently performed for each public cloud to which the private cloud is linked, enabling scalable management of virtual machines in a plurality of heterogeneous public clouds. However, process 400 may be susceptible to Man-in-the-Middle attacks. This can be improved by using SSH host authentication as discussed above. FIG. 4B illustrates an example process 450 for providing secure access to virtual machines in heterogeneous cloud environments. In this example embodiment, the process 450 may be initiated by generating a first host key comprising a third public-private key pair 452 using a public-key algorithm (e.g., RSA, DSA, ECDSA, DH, ECDH, etc.), and inserting the first host key into a virtual machine running in a private cloud 454. Although this example embodiment implements public-key cryptography, it should be understood that other example embodiments can utilize other credentials or other authentication methods (e.g., passwords, secret keys of symmetric-key cryptography algorithms, Kerberos, NTLM, keyboard-interactive, etc.) for host authentication. First information associating the host key or a first fingerprint of a public portion of the host key (i.e., third public key) can be stored to the private cloud 456, such as in a database or similar object (e.g., list) of known hosts. In this example embodiment, the first fingerprint can be generated by performing a hash function (e.g., CRC-32, MAC, UMAC, MD5, SHA-1, RIPEMD-160, etc.) on the public portion of the host key (i.e., third public key). Other example embodiments may utilize other techniques for generating a fingerprint or signature of the host key as is known in the art.

Upon an initial login to the virtual machine, such as just prior to or contemporaneously with performing step 408 in FIG. 4A, the method 450 may proceed by receiving the public portion of the host key (i.e., third public key) or the first fingerprint to the private cloud, such as a hybrid cloud manager (e.g., ICFD and PNSC) or similar entity. This credential can be used for authenticating the virtual machine 458. For example, the public portion of the first host key (i.e., third public key) or the first fingerprint can be matched to a portion of the first information stored in the database. After successfully accessing the virtual machine, such as following performance of step 408 in FIG. 4A, a second host key comprising a fourth public-private key pair can be generated 460 using public-key cryptography in a manner similar to step 452. The second host key (i.e., fourth public-private key pair) can be used to replace the first host key (i.e., third public-private key pair) in the virtual machine in the public cloud 462.

Second information associating the virtual machine to a public portion of the second host key (i.e., fourth public key) or a second fingerprint of the public portion of the second host key can also be stored to the known hosts database or similar object (e.g., list). In some example embodiments, the first information must also be explicitly removed from the known hosts database. Immediately prior to performing step 414 of FIG. 4A, the hybrid cloud manager can receive the public portion of the second host key (i.e., fourth public key) or the second fingerprint. This credential can be used to authenticate the virtual machine 464 in a manner similar to step 458.

Figure 5:
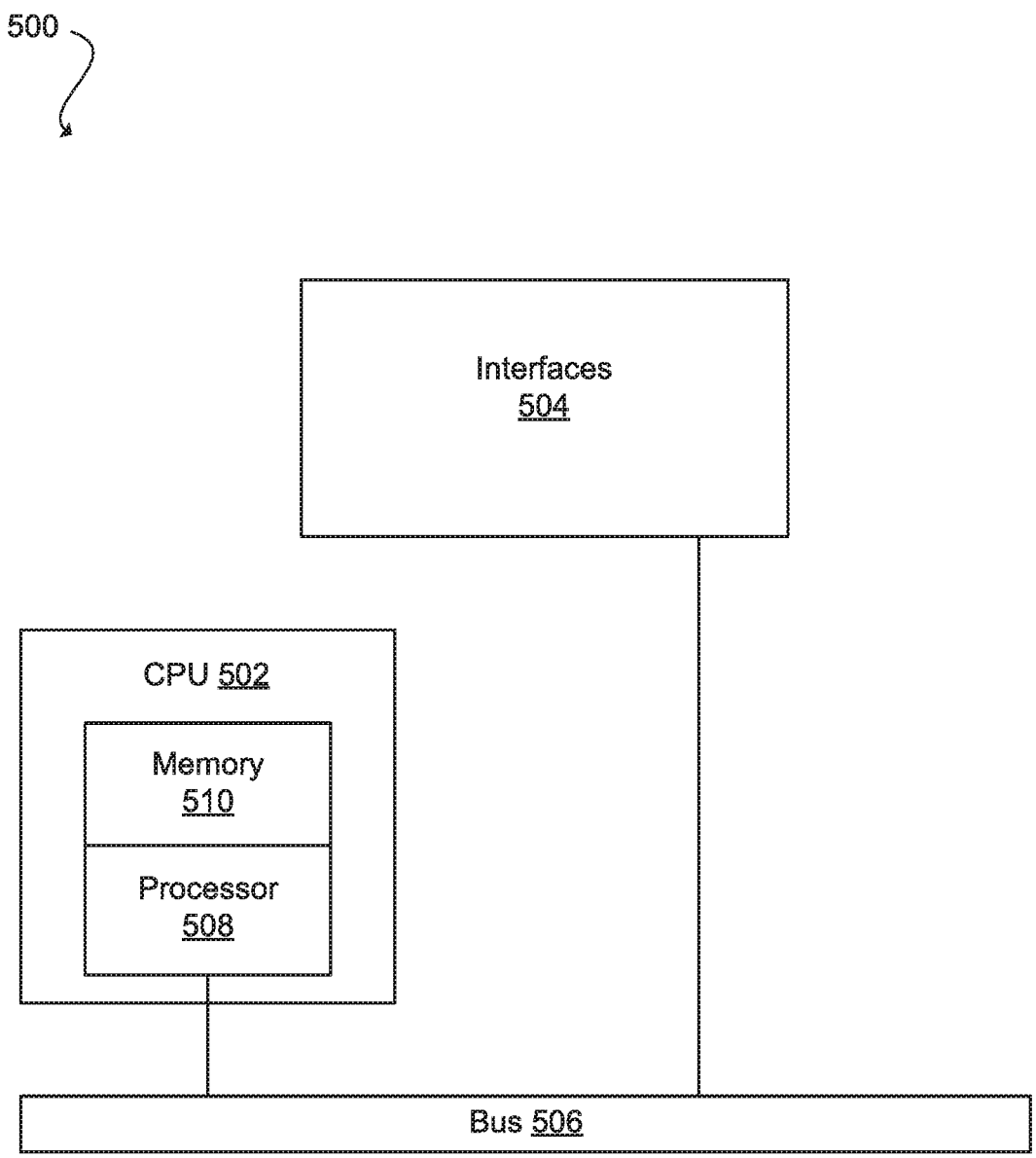
FIG. 5 illustrates an example network device that can be used in various example embodiments.

FIG. 5 illustrates an example network device 500 that can be used in accordance with various example embodiments. Network device 500 includes a master central processing unit (CPU) 502, interfaces 504, and a bus 506 (e.g., a PCI bus). When acting under the control of appropriate software or firmware, the CPU 502 is responsible for executing packet management, error detection, and/or routing functions, such policy enforcement, for example. The CPU 502 preferably accomplishes all these functions under the control of software including an operating system and any appropriate applications software. CPU 502 may include one or more processors 508 such as a processor from the Motorola family of microprocessors or the MIPS family of microprocessors. In an alternative embodiment, processor 508 is specially designed hardware for controlling the operations of device 500. In a specific embodiment, a memory 510 (such as non-volatile RAM and/or ROM) also forms part of CPU 502. However, there are many different ways in which memory could be coupled to the system.

The interfaces 504 are typically provided as interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 502 to efficiently perform routing computations, network diagnostics, security functions, etc.

Although the system shown in FIG. 5 is one specific network device, it is by no means the only network device architecture on which each embodiment can be implemented. For example, an architecture having a single processor that handles communications as well as routing computations, etc., is often used. Further, other types of interfaces and media could also be used with the router.

Regardless of the network device's configuration, it may employ one or more memories or memory modules (including memory 510) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6A:
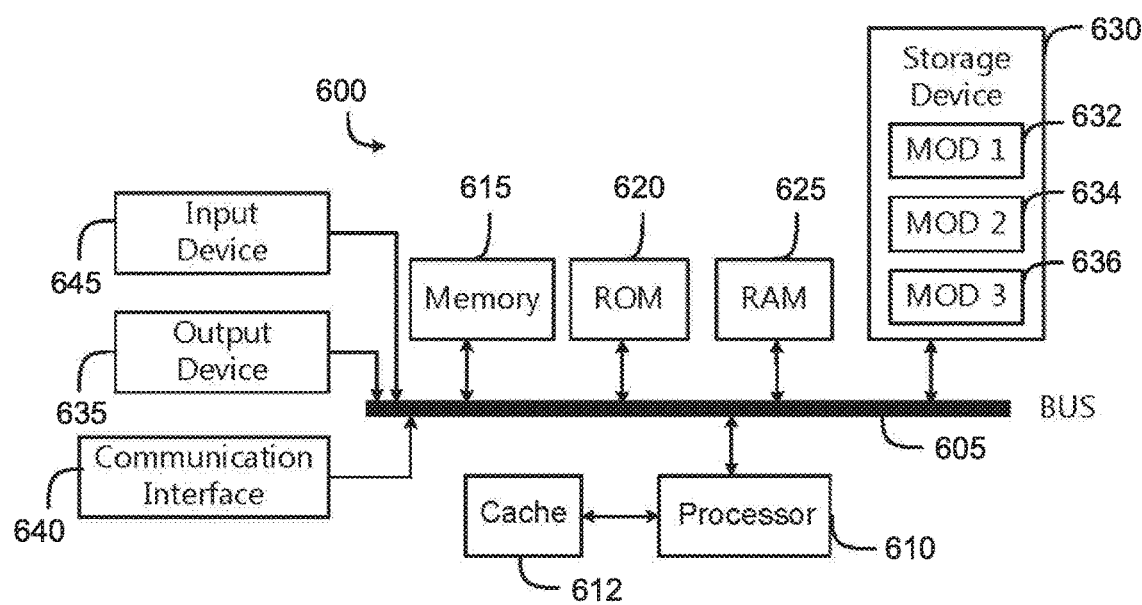
FIGS. 6A and 6B illustrate example systems that can be used in various example embodiments.
Figure 6B:
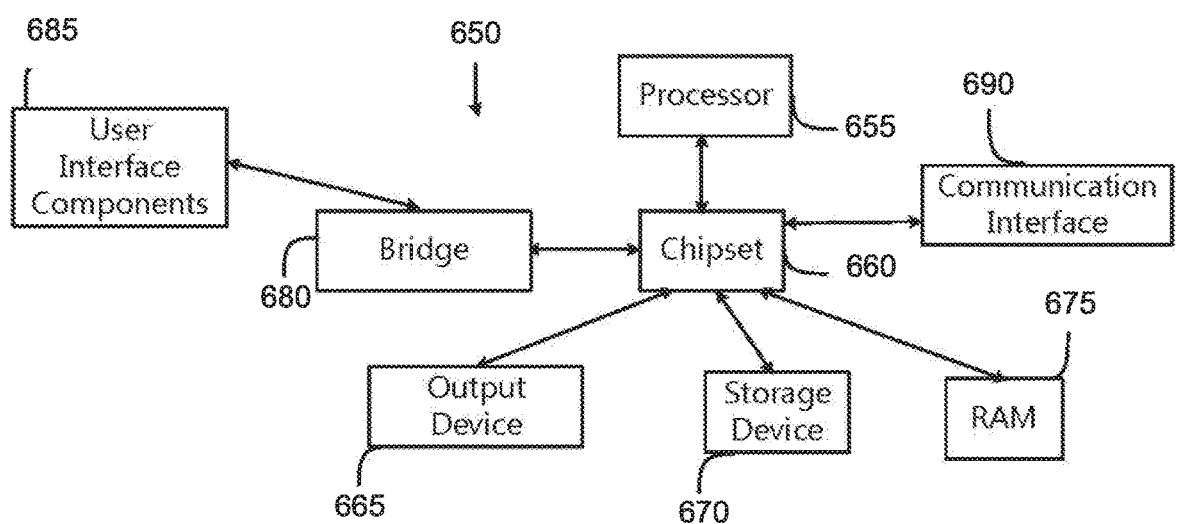

FIG. 6A and FIG. 6B illustrate systems that can be used in various example embodiments. The more appropriate embodiment will be apparent to those of ordinary skill in the art when practicing the present technology. Persons of ordinary skill in the art will also readily appreciate that other embodiments are possible.

FIG. 6A illustrates a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech, among others. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising: generating a first public-private key pair including a first public key and a first private key; inserting the first public key into a virtual machine in a first cloud; migrating the virtual machine from the first cloud to a second cloud; accessing the virtual machine in the second cloud for a first time based at least in part on first encrypted data encrypted using the first private key, the virtual machine providing access based at least in part on a first decryption of the first encrypted data using the first public key to generate first unencrypted data and a first comparison of the first unencrypted data to first data; generating a second public-private key pair including a second public key and a second private key; replacing the first public key in the virtual machine in the second cloud with the second public key; accessing the virtual machine in the second cloud for a second time based at least in part on second encrypted data encrypted using the second private key, the virtual machine providing access based at least in part on a second decryption of the second encrypted data using the second public key to generate second unencrypted data and a second comparison of the second unencrypted data to second data; and wherein the first cloud is a private cloud and the second cloud is a public cloud.

2. The method of claim 1, further comprising:
generating a third public-private key pair including a third public key and a third private key;
inserting the third public key and the third private key into the virtual machine in the first cloud;
storing, in a database, first information associating the third public key or a first fingerprint of the third public key to the virtual machine;
receiving, at the first cloud, the third public key or the first fingerprint from the virtual machine in the second cloud; and
authenticating, at the first cloud, the virtual machine in the second cloud based at least in part on matching the third public key or the first fingerprint received from the virtual machine in the second cloud to a portion of the first information.

3. The method of claim 2, wherein the authenticating comprises matching one or more first server credentials to a portion of the first information.

4. The method of claim 2, further comprising:
generating a fourth public-private key pair including a fourth public key and a fourth private key;
replacing the third public key in the virtual machine in the second cloud with the fourth public key and the third private key in the virtual machine in the second cloud with the fourth private key;
storing, in the database, second information associating the fourth public key or a second fingerprint of the fourth public key to the virtual machine;
receiving, at the first cloud, the fourth public key or the second fingerprint from the virtual machine in the second cloud; and
authenticating, from the first cloud, the virtual machine in the second cloud based at least in part on matching the fourth public key received from the virtual machine in the second cloud to a portion of the second information.

5. The method of claim 1, wherein accessing the virtual machine in the second cloud for the first time comprises:
encrypting first data using the first private key to generate first encrypted data; and
sending the first encrypted data to the virtual machine in the second cloud,
wherein first access to the virtual machine in the second cloud for the first time is based at least in part on a first decryption of the first encrypted data using the first public key to generate first unencrypted data and a first comparison of the first unencrypted data to the first data.

6. The method of claim 1, further comprising:
installing a secure tunnel driver in the virtual machine in the first cloud;
wherein the secure tunnel driver enables a secure tunnel to be established to connect the virtual machine in the second cloud to a cloud gateway of the second cloud.

7. A system comprising: one or more processors; and memory including instructions that, upon being executed by the one or more processors, cause the system to perform operations comprising: generating a first public-private key pair including a first public key and a first private key; inserting the first public key into a virtual machine in a first cloud; migrating the virtual machine from the first cloud to a second cloud; accessing the virtual machine in the second cloud for a first time based at least in part on first encrypted data encrypted using the first private key, the virtual machine providing access based at least in part on a first decryption of the first encrypted data using the first public key to generate first unencrypted data and a first comparison of the first unencrypted data to first data; generating a second public-private key pair including a second public key and a second private key; replacing the first public key in the virtual machine in the second cloud with the second public key; accessing the virtual machine in the second cloud for a second time based at least in part on second encrypted data encrypted using the second private key, the virtual machine providing access based at least in part on a second decryption of the second encrypted data using the second public key to generate second unencrypted data and a second comparison of the second unencrypted data to second data; and wherein the first cloud is a private cloud and the second cloud is a public cloud.

8. The system of claim 7, further comprising:
generating a third public-private key pair including a third public key and a third private key;
inserting the third public key and the third private key into the virtual machine in the first cloud;
storing, in a database, first information associating the third public key or a first fingerprint of the third public key to the virtual machine;
receiving, at the first cloud, the third public key or the first fingerprint from the virtual machine in the second cloud; and
authenticating, at the first cloud, the virtual machine in the second cloud based at least in part on matching the third public key or the first fingerprint received from the virtual machine in the second cloud to a portion of the first information.

9. The system of claim 8, wherein the authenticating comprises matching one or more first server credentials to a portion of the first information.

10. The system of claim 8, further comprising:
generating a fourth public-private key pair including a fourth public key and a fourth private key;
replacing the third public key in the virtual machine in the second cloud with the fourth public key and the third private key in the virtual machine in the second cloud with the fourth private key;
storing, in the database, second information associating the fourth public key or a second fingerprint of the fourth public key to the virtual machine;
receiving, at the first cloud, the fourth public key or the second fingerprint from the virtual machine in the second cloud; and
authenticating, from the first cloud, the virtual machine in the second cloud based at least in part on matching the fourth public key received from the virtual machine in the second cloud to a portion of the second information.

11. The system of claim 7, wherein accessing the virtual machine in the second cloud for the first time comprises:
encrypting first data using the first private key to generate first encrypted data; and
sending the first encrypted data to the virtual machine in the second cloud, wherein first access to the virtual machine in the second cloud for the first time is based at least in part on a first decryption of the first encrypted data using the first public key to generate first unencrypted data and a first comparison of the first unencrypted data to the first data.

12. The system of claim 7, further comprising:
installing a secure tunnel driver in the virtual machine in the first cloud;
wherein the secure tunnel driver enables a secure tunnel to be established to connect the virtual machine in the second cloud to a cloud gateway of the second cloud.

13. A non-transitory computer-readable storage medium having stored therein instructions that, upon being executed by a processor, cause the processor to perform operations comprising: generating a first public-private key pair including a first public key and a first private key; inserting the first public key into a virtual machine in a first cloud; migrating the virtual machine from the first cloud to a second cloud; accessing the virtual machine in the second cloud for a first time based at least in part on first encrypted data encrypted using the first private key, the virtual machine providing access based at least in part on a first decryption of the first encrypted data using the first public key to generate first unencrypted data and a first comparison of the first unencrypted data to first data; generating a second public-private key pair including a second public key and a second private key; replacing the first public key in the virtual machine in the second cloud with the second public key; accessing the virtual machine in the second cloud for a second time based at least in part on second encrypted data encrypted using the second private key, the virtual machine providing access based at least in part on a second decryption of the second encrypted data using the second public key to generate second unencrypted data and a second comparison of the second unencrypted data to second data; and wherein the first cloud is a private cloud and the second cloud is a public cloud.

14. The medium of claim 13, the operations further comprising:
generating a third public-private key pair including a third public key and a third private key;
inserting the third public key and the third private key into the virtual machine in the first cloud;
storing, in a database, first information associating the third public key or a first fingerprint of the third public key to the virtual machine;
receiving, at the first cloud, the third public key or the first fingerprint from the virtual machine in the second cloud; and
authenticating, at the first cloud, the virtual machine in the second cloud based at least in part on matching the third public key or the first fingerprint received from the virtual machine in the second cloud to a portion of the first information.

15. The medium of claim 14, wherein the authenticating comprises matching one or more first server credentials to a portion of the first information.

16. The medium of claim 14, operations further comprising:
generating a fourth public-private key pair including a fourth public key and a fourth private key;
replacing the third public key in the virtual machine in the second cloud with the fourth public key and the third private key in the virtual machine in the second cloud with the fourth private key;
storing, in the database, second information associating the fourth public key or a second fingerprint of the fourth public key to the virtual machine;
receiving, at the first cloud, the fourth public key or the second fingerprint from the virtual machine in the second cloud; and
authenticating, from the first cloud, the virtual machine in the second cloud based at least in part on matching the fourth public key received from the virtual machine in the second cloud to a portion of the second information.

17. The medium of claim 13, wherein accessing the virtual machine in the second cloud for the first time comprises:
encrypting first data using the first private key to generate first encrypted data; and
sending the first encrypted data to the virtual machine in the second cloud,
wherein first access to the virtual machine in the second cloud for the first time is based at least in part on a first decryption of the first encrypted data using the first public key to generate first unencrypted data and a first comparison of the first unencrypted data to the first data.

* * * * *